US011277239B2

(12) United States Patent
Ihalainen et al.

(10) Patent No.: US 11,277,239 B2
(45) Date of Patent: Mar. 15, 2022

(54) METHODS AND APPARATUSES FOR PHASE TRACKING REFERENCE SIGNAL DESIGN

(71) Applicant: Nokia Technologies Oy, Espoo (FI)

(72) Inventors: Tero Ihalainen, Nokia (FI); Kari Pajukoski, Oulu (FI); Youngsoo Yuk, Seoul (KR)

(73) Assignee: NOKIA TECHNOLOGIES OY, Espoo (FI)

( * ) Notice: Subject to any disclaimer, the term of this patent is extended or adjusted under 35 U.S.C. 154(b) by 83 days.

(21) Appl. No.: 16/619,426

(22) PCT Filed: Jun. 22, 2018

(86) PCT No.: PCT/US2018/038981
§ 371 (c)(1),
(2) Date: Dec. 4, 2019

(87) PCT Pub. No.: WO2018/237258
PCT Pub. Date: Dec. 27, 2018

(65) Prior Publication Data
US 2020/0304259 A1    Sep. 24, 2020

Related U.S. Application Data

(60) Provisional application No. 62/524,051, filed on Jun. 23, 2017.

(51) Int. Cl.
*H04B 5/00* (2006.01)
*H04L 5/00* (2006.01)
(Continued)

(52) U.S. Cl.
CPC ......... *H04L 5/0048* (2013.01); *H04B 7/0413* (2013.01); *H04B 7/2628* (2013.01); *H04L 5/0007* (2013.01); *H04W 72/04* (2013.01)

(58) Field of Classification Search
CPC ..... H04L 5/0048; H04L 5/0007; H04L 7/043; H04L 7/0413; H04W 72/04; H04B 7/2628
See application file for complete search history.

(56) References Cited

U.S. PATENT DOCUMENTS

2005/0191965 A1* 9/2005 Yu .................. H04L 1/0027
455/67.16
2009/0310707 A1  12/2009 Cheng et al.
(Continued)

FOREIGN PATENT DOCUMENTS

EP          1037442 A2     9/2000
JP          2001197138 A   7/2001

OTHER PUBLICATIONS

"Final Report of 3GPP TSG RAN WG1 #89 v1.0.0", 3GPP TSG-RAN WG1 Meeting #90, R1-1712031, MCC Support, Aug. 21-25, 2017, pp. 1-164.
(Continued)

*Primary Examiner* — Rahel Guarino
(74) *Attorney, Agent, or Firm* — Squire Patton Boggs (US) LLP

(57) ABSTRACT

Systems, methods, apparatuses, and computer program products relating to phase tracking reference signal (PT-RS) design, for example, for discrete Fourier transform spread orthogonal frequency division multiplexing (DFT-S-OFDM), are provided. One method may include forming, by a network node, a phase tracking reference signal (PT-RS) sample sequence using outer-most constellation points corresponding to scheduled modulation order of data channel, and scrambling the phase tracking reference signal (PT-RS) sample sequence with a user equipment-specific sequence.

19 Claims, 11 Drawing Sheets

(51) Int. Cl.
*H04B 7/0413* (2017.01)
*H04B 7/26* (2006.01)
*H04W 72/04* (2009.01)

(56) References Cited

U.S. PATENT DOCUMENTS

2018/0359071 A1* 12/2018 Lee ................. H04L 5/0092
2020/0052740 A1* 2/2020 Zhang ................. H04B 7/02

OTHER PUBLICATIONS

"Final Report of 3GPP TSG RAN WG1 #88bis v1.0.0", 3GPP TSG-RAN WG1 Meeting #89, R1-1708890, MCC Support, May 15-19, 2017, pp. 1-154.

"Final Report of 3GPP TSG RAN WG1 #AH1_NR v1.0.0", 3GPP TSG-RAN WG1 Meeting #88, R1-1701553, MCC Support, Feb. 13-17, 2017, pp. 1-106.

International Search Report and Written Opinion received for corresponding Patent Cooperation Treaty Application No. PCT/US2018/038981, dated Dec. 13, 2018, 18 pages.

"UL PTRS for DFTsOFDM Waveform", 3GPP TSG-RAN WG1 meeting #89, R1-1708997, Agenda: 7.1.2.4.3,Mitsubishi Electric, May 15-19, 2017, 9 pages.

"Work Plan for Rel-15 NR WI", 3GPP TSG-RAN WG1 meeting #89, R1-1708434, Agenda: 7.1, NTT Docomo, Inc., May 15-19, 2017, pp. 1-30.

"On Details of the PT-RS Design for DFT-s-OFDM", 3GPP TSG-RAN WG1 NR Ad-Hoc Meeting #2, R1-1711309, Agenda: 5.1.2.4.3, Nokia, Jun. 27-30, 2017, 4 pages.

Office action received for corresponding European Patent Application No. 18746336.9, dated Mar. 30, 2021, 5 pages.

* cited by examiner

METHODS AND APPARATUSES FOR PHASE TRACKING REFERENCE SIGNAL DESIGN

RELATED APPLICATION

This application was originally filed as PCT Application No. PCT/US2018/038981 filed Jun. 22, 2018 which claims priority benefit from U.S. Patent Application No. 62/524,051 filed Jun. 23, 2017.

CROSS REFERENCE TO RELATED APPLICATIONS

This application claims priority from U.S. Provisional Application No. 62/524,051, filed on Jun. 23, 2017. The entire contents of this earlier filed application are hereby incorporated by reference in their entirety.

BACKGROUND

Field

Embodiments of the invention generally relate to wireless or cellular communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), LTE-A Pro, and/or 5G radio access technology or new radio access technology (NR). Some embodiments may generally relate to cellular radio implementation(s), for example, including 2G, 3G, 4G, 5G radio access network (RAN), cellular Internet of Things (IoT) RAN, and/or cellular radio hardware.

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (Evolved-UTRAN), the air interface design, protocol architecture and multiple-access principles are new compared to that of UTRAN, and no RNC exists and radio access functionality is provided by an evolved Node B (eNodeB or eNB) or many eNBs. Multiple eNBs are involved for a single UE connection, for example, in case of Coordinated Multipoint Transmission (CoMP) and in dual connectivity.

Long Term Evolution (LTE) or E-UTRAN improved efficiency and services, offers lower costs, and provides new spectrum opportunities, compared to the earlier generations. In particular, LTE is a 3GPP standard that provides for uplink peak rates of at least, for example, 75 megabits per second (Mbps) per carrier and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD). Carrier aggregation or said dual connectivity further allows operating on multiple component carriers at the same time hence multiplying the performance such as data rates per user.

As mentioned above, LTE may also improve spectral efficiency in networks, allowing carriers to provide more data and voice services over a given bandwidth. Therefore, LTE is designed to fulfill the needs for high-speed data and media transport in addition to high capacity voice support. Advantages of LTE include, for example, high throughput, low latency, FDD and TDD support in the same platform, an improved end-user experience, and a simple architecture resulting in low operating costs.

Certain further releases of 3GPP LTE (e.g., LTE Rel-10, LTE Rel-11) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while maintaining backward compatibility. One of the key features of LTE-A, introduced in LTE Rel-10, is carrier aggregation, which allows for increasing the data rates through aggregation of two or more LTE carriers. The next releases of 3GPP LTE (e.g. LTE Rel-12, LTE Rel-13, LTE Rel-14, LTE Rel-15) are targeted for further improvements of specialized services, shorter latency and meeting requirements approaching the 5G.

$5^{th}$ generation (5G) or new radio (NR) wireless systems refer to the next generation (NG) of radio systems and network architecture. 5G is also known to appear as the IMT-2020 system. It is estimated that 5G will provide bitrates on the order of 10-20 Gbit/s or higher. 5G will support at least enhanced mobile broadband (eMBB) and ultra-reliable low-latency-communication (URLLC) as well as massive machine type communication (mMTC). 5G is also expected to increase network expandability up to hundreds of thousands of connections. The signal technology of 5G is anticipated for greater coverage as well as spectral and signaling efficiency. 5G is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. In 5G or NR, the node B or eNB may be referred to as a next generation node B (gNB).

SUMMARY

One embodiment is directed to a method that may include a network node forming or obtaining a PT-RS sample sequence using an outer-most constellation points corresponding to the scheduled modulation order of the data channel. According to an embodiment, the method may include scrambling the obtained PT-RS sample sequence with a UE-specific sequence. In one embodiment, the forming/obtaining may include UE-specifically configuring the PT-RS burst periodicity and burst length based on, for example, residual FO estimated by the network node, a CQI reported by UE, and/or information on time-correlation properties of the UE's LO PN. In one embodiment, the method may include signaling, to a UE, the PT-RS sequence configured for the UE.

Another embodiment is directed to an apparatus that may include at least one processor and at least one memory including computer program code. The at least one memory and the computer program code may be configured, with the at least one processor, to cause the apparatus at least to form or obtain a PT-RS sample sequence using an outer-most constellation points corresponding to the scheduled modulation order of the data channel. According to an embodiment, the at least one memory and the computer program code are configured, with the at least one processor, to cause the apparatus at least to scramble the obtained PT-RS sample sequence with a UE-specific sequence. In one embodiment, the at least one memory and the computer program code are configured, with the at least one processor, to cause the apparatus at least to form/obtain the PT-RS sequence by UE-specifically configuring the PT-RS burst periodicity and burst length based on, for example, residual FO estimated by the network node, a CQI reported by UE, and/or information on time-correlation properties of the UE's LO PN. In one embodiment, the at least one memory and the computer program code are configured, with the at least one processor, to cause the apparatus at least to signal, to a UE, the PT-RS sequence configured for the UE.

Another embodiment is directed to an apparatus that may include forming means for forming or obtaining a PT-RS sample sequence using an outer-most constellation points corresponding to the scheduled modulation order of the data channel. According to an embodiment, the apparatus may include scrambling means for scrambling the obtained PT-RS sample sequence with a UE-specific sequence. In one embodiment, the forming means may include configuring means for UE-specifically configuring the PT-RS burst periodicity and burst length based on, for example, residual FO estimated by the network node, a CQI reported by UE, and/or information on time-correlation properties of the UE's LO PN. In one embodiment, the apparatus may include transmitting means for signaling, to a UE, the PT-RS sequence configured for the UE.

Another embodiment is directed to a method that may include a UE transmitting, to a network node (e.g., gNB), the UE's estimates of: the LO induced PN time-correlation properties, Doppler frequency, and/or information regarding the UE's ability to perform advanced interpolation methods, such as Wiener estimation compared to linear. In an embodiment, the method may also include receiving an indication of the PT-RS sequence as specifically configured and optimized for the UE. According to one embodiment, the method may also include applying the received PT-RS sequence.

Another embodiment is directed to an apparatus that may include at least one processor and at least one memory including computer program code. The at least one memory and the computer program code may be configured, with the at least one processor, to cause the apparatus at least to transmit, to a network node (e.g., gNB), the apparatus' estimates of: the LO induced PN time-correlation properties, Doppler frequency, and/or information regarding the UE's ability to perform advanced interpolation methods, such as Wiener estimation compared to linear. In an embodiment, the at least one memory and the computer program code may be configured, with the at least one processor, to cause the apparatus at least to receive an indication of the PT-RS sequence as specifically configured and optimized for the apparatus. According to one embodiment, the at least one memory and the computer program code may be configured, with the at least one processor, to cause the apparatus at least to apply the received PT-RS sequence.

Another embodiment is directed to an apparatus that may include transmitting means for transmitting, to a network node (e.g., gNB), the apparatus' estimates of: the LO induced PN time-correlation properties, Doppler frequency, and/or information regarding the UE's ability to perform advanced interpolation methods, such as Wiener estimation compared to linear. In an embodiment, the apparatus may also include receiving means for receiving an indication of the PT-RS sequence as specifically configured and optimized for the apparatus. According to one embodiment, the apparatus may also include applying means for applying the received PT-RS sequence.

BRIEF DESCRIPTION OF THE DRAWINGS

For proper understanding of the invention, reference should be made to the accompanying drawings, wherein.

DETAILED DESCRIPTION

Figure 1:
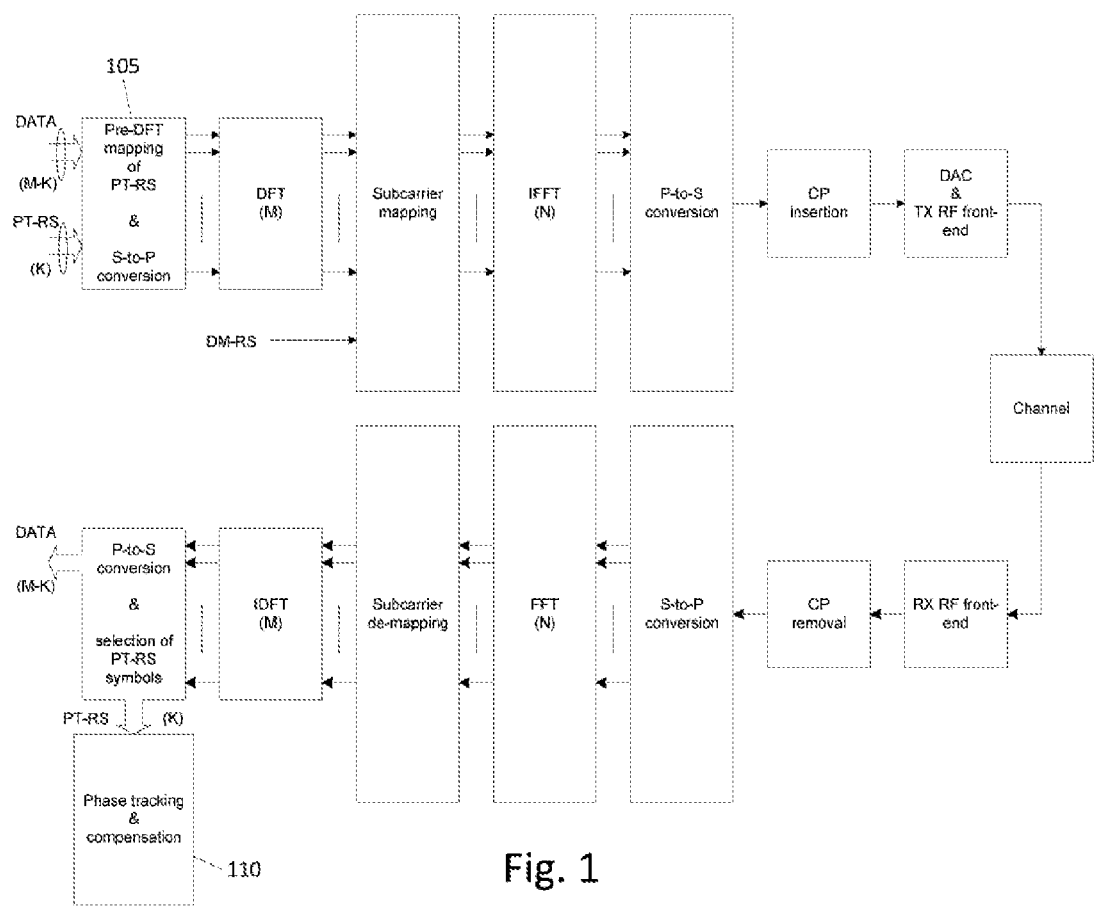
FIG. 1 illustrates an example block diagram depicting the processing blocks of DFT-s-OFDM transmitter-receiver processing chains, according to an embodiment.

It will be readily understood that the components of the invention, as generally described and illustrated in the figures herein, may be arranged and designed in a wide variety of different configurations. Thus, the following detailed description of the embodiments of systems, methods, apparatuses, and computer program products relating to phase tracking reference signal (PT-RS) design, for example, for discrete Fourier transform spread orthogonal frequency division multiplexing (DFT-S-OFDM), as represented in the attached figures and described below, is not intended to limit the scope of the invention but is representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Some embodiments described herein may relate to radio frequency (RF) impairment and/or channel compensation in DFT-s-OFDM waveform based NR cellular systems operating in high-speed deployment scenarios and/or in centimeter (cm) or millimeter (mm)-bands.

At carrier frequencies above 6 GHz, oscillator induced phase noise (PN) (e.g., due to implementation imperfections) becomes gradually more significant with increasing frequency and may result in severe degradation of detection performance, especially in case of higher order modulation schemes, unless properly addressed. Phase variations in time may also be caused by other phenomena such as frequency drifts due to Doppler shift or due to insufficient frequency synchronization. Depending on the receiver's (e.g., UE's) operation point, which is characterized by factors including, e.g., carrier frequency, subcarrier spacing, scheduled bandwidth and/or modulation and coding scheme (MCS), or UE velocity, the phase variation due to any of the above-mentioned effects may require compensation to guarantee successful data transmission.

In LTE, cell-specific Common Reference Signal (CRS) pilots have been utilized for fine frequency and time tracking. Due to lower carrier frequencies, no dedicated reference signal for tracking phase due to PN has been considered in LTE. For New Radio (NR), the design and performance of phase tracking reference signal (PT-RS) is being studied, considering both cyclic prefix (CP)-OFDM and DFT-s-OFDM waveforms.

Regarding different schemes for the PT-RS insertion for DFT-s-OFDM, there are currently three candidate options, which include pre-DFT PT-RS insertion, post-DFT PT-RS insertion with data puncturing, and post-DFT PT-RS insertion without data puncturing. For pre-DFT PT-RS insertion, M-point DFT of data+PT-RS block (comprising K PT-RS symbols time division multiplexed (TDMed) with M-K data symbols) is taken and mapped to M input bins of N-point inverse fast fourier transform (IFFT). For post-DFT PT-RS insertion with data puncturing, M-point DFT of length-M data symbol block is first taken, and then, from the outcome, K output samples are punctured and replaced with PT-RS symbols prior mapping to M input bins of N-point IFFT. For post-DFT PT-RS insertion without data puncturing, (M-K)-point DFT of data symbol block is first taken, and then, those M-K output samples are frequency division multiplexed (FDMed) with K PT-RS symbols to M input bins of N-point IFFT.

Both post-DFT insertion schemes may have the merit that they would enable symmetric PT-RS design for CP-OFDM and DFT-s-OFDM based UL waveforms. The same receiver processing chain for PT-RS based PN tracking could therefore be applied independent of the UL waveform type. On the other hand, both post-DFT schemes result in loss of the single carrier property with degrading impact on the peak to average power ratio (PAPR) and cubic metric (CM). This is a major drawback considering the fact that DFT-s-OFDM is primarily aimed as the waveform for coverage-limited scenarios where power efficient power amplifier operation is a key concern. Moreover, the PN tracking ability of both post-DFT PT-RS insertion methods is limited by the time-domain resolution of one DFT-s-OFDM symbol.

Furthermore, in the case of post-DFT PT-RS with data puncturing, the data demodulation performance is subject to degradation, with the level of which being dependent on the number of SCs punctured for PT-RS. The other post-DFT scheme with (M-K)-point DFT may require new DFT sizes beyond those low-complexity ones currently used for LTE. From the (I)DFT block implementation complexity point of view it may be preferable to keep the LTE-like design principle where the transform size can be expressed as a product of small numbers e.g. {2, 3, 5} such that existing efficient FFT-like implementations as combinations of radix 2, 3, and 5 DFTs can be used.

The pre-DFT scheme can preserve the desired single-carrier property of the DFT-s-OFDM waveform and consequently provide lower PAPR and CM metrics compared to post-DFT insertion schemes. In addition, due to the fact that PN estimation based on the pre-DFT inserted PT-RS symbols is performed in time domain after receiver inverse discrete Fourier transform (IDFT), the estimator can benefit from the higher time-resolution, providing a means for improved tracking of PN time variation.

Certain embodiments described herein may provide a flexible and UE-specifically configurable PT-RS design that can adapt to diverse operation points of different UEs, and/or may provide PT-RS sequence design techniques that can reduce the PT-RS overhead, e.g., by improving the SNR of received raw PT-RS samples as well as enabling efficient multiplexing of PT-RS resources of different UEs in uplink (UL) multi-user (MU)-multiple-input multiple-output (MIMO).

According to one embodiment, the outer-most constellation points corresponding to the scheduled modulation order of the Physical Uplink Shared Data Channel (PUSCH) may be used to form the PT-RS sample sequence. In an embodiment, the sample sequence obtained as mentioned above may be scrambled with UE-specific sequence.

In one embodiment, Orthogonal Cover Code (OCC) of length L may be utilized across the L consequent PT-RS samples in time within a PT-RS burst to Code Division Multiplex (CDM) multiple PT-RS ports of a given UE or multiple PT-RS ports among different MU-MIMO users with same physical resource block (PRB) allocation.

According to one embodiment, a gNB may UE-specifically configure the PT-RS burst periodicity and burst length based on, for example, i) residual frequency offset (FO) (due to insufficient frequency synchronization and/or Doppler) estimated by the gNB, ii) channel quality indication (CQI) reported by the UE, and/or iii) information on time-correlation properties of UE's local oscillator (LO) phase noise (PN) (obtained, e.g., in the form UE device category during the RRC hand-shake). Based on this information and the ability to perform advanced interpolation methods (e.g., Wiener estimation compared to linear), the gNB can optimize the PT-RS time pattern (periodicity and length of the PT-RS bursts) and optimize the L parameter.

In an embodiment, a UE may report, for example, in PUCCH, its estimates of i) the LO induced PN time-correlation properties, and/or ii) Doppler frequency. Based on this information, the gNB can optimize the PT-RS time pattern (periodicity and length of the PT-RS bursts). According to one embodiment, the number of PT-RS samples may be defined based on an amount of allocated PRBs. For example, in one embodiment, the number of PT-RS samples may be defined by using the following equation: ceil(number of scheduled PRBs/R), where R={4,2,1}.

As mentioned above, certain embodiments relate to a PT-RS design and associated receiver signal processing, for example, in a pre-DFT PT-RS insertion based DFT-s-OFDM transmission. FIG. 1 illustrates an example of the principal processing blocks of DFT-s-OFDM transmitter-receiver processing chains in case of pre-DFT PT-RS insertion. One embodiment may focus on the blocks titled as "Pre-DFT mapping of PT-RS" 105 (on transmitter side) and "Phase tracking and compensation" 110 (on receiver side).

Figure 2:
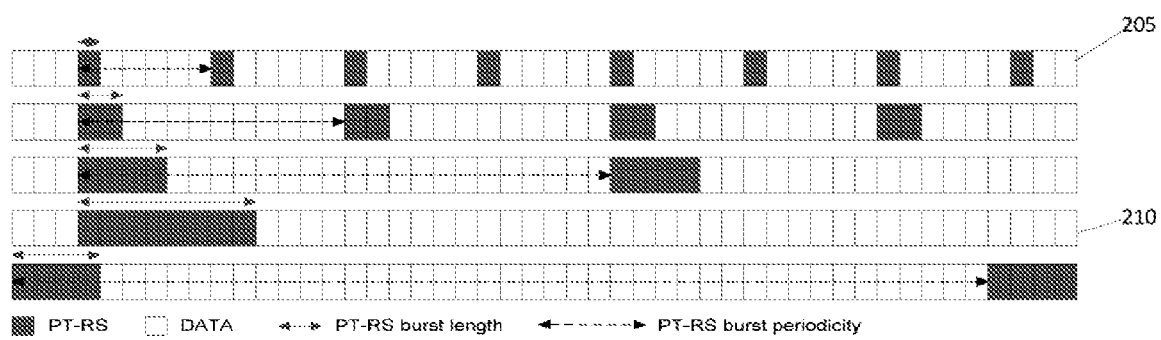
FIG. 2 illustrates an example of time-distributed versus time-localized PT-RS sequence mapping, according to an embodiment.

FIG. 2 illustrates an example of time-distributed versus time-localized PT-RS sequence mapping within M-element DFT input block. For example, FIG. 2 illustrates different ways of time division multiplexing K=8 PT-RS sequence samples with M−K=40 data samples to a form M-element DFT sample block. The different patterns of FIG. 2 represent cases ranging from the fully distributed in time pattern 205 to that of the fully time-localized pattern 210. Assuming a fixed PT-RS sample budget of K samples, the uniformly distributed pattern 205 provides the lowest PT-RS burst period with the minimum PT-RS burst length of one, which consequently maximizes the time domain sampling resolution of the pattern. A low PT-RS period may be required to track aggressive PN process with low time correlation. On the other hand, placing of the PT-RS samples to consecutive samples in time, as shown in pattern 210, provides a possibility to average across multiple PN estimates within a PT-RS burst, which can improve the noise averaging of the time-localized PN estimates especially at low SNRs.

If any PT-RS pattern with at least two consecutive samples are used, by using OCC, CDM multiplexing with different UE's or antenna ports may be possible. Especially for MU-MIMO, CDM multiplexing of PT-RS is very efficient to increase the multiplexing capability without generating overhead.

The PN and/or FO estimates for data symbol positions can be interpolated and/or extrapolated based on the estimates obtained from PT-RS bursts. Linear interpolation can be assumed as a baseline solution at least for PT-RS based tracking and compensation of FO induced linear change in phase over time as well as for PN compensation with modest-to-high time correlation characteristics in comparison to DFT-s-OFDM symbol duration. For the PN processes with very low time correlation (and consequently fast time-varying PN within a DFT-s-OFM symbol) or in case of very high Doppler, Wiener interpolation exploiting time-correlation models in interpolation filter coefficient optimization can be applied.

While full flexibility in PT-RS time domain pattern configuration is in principal possible, such a design may suffer either from very high signalling overhead or complicated implicit determination rules to derive the pattern details. A practical solution, which can provide a good trade-off between flexibility to support diverse UE operation points, simplified determination/signalling of the PT-RS pattern details, and receiver processing complexity required to support different configurations can be obtained according to embodiments described below.

Figure 3:
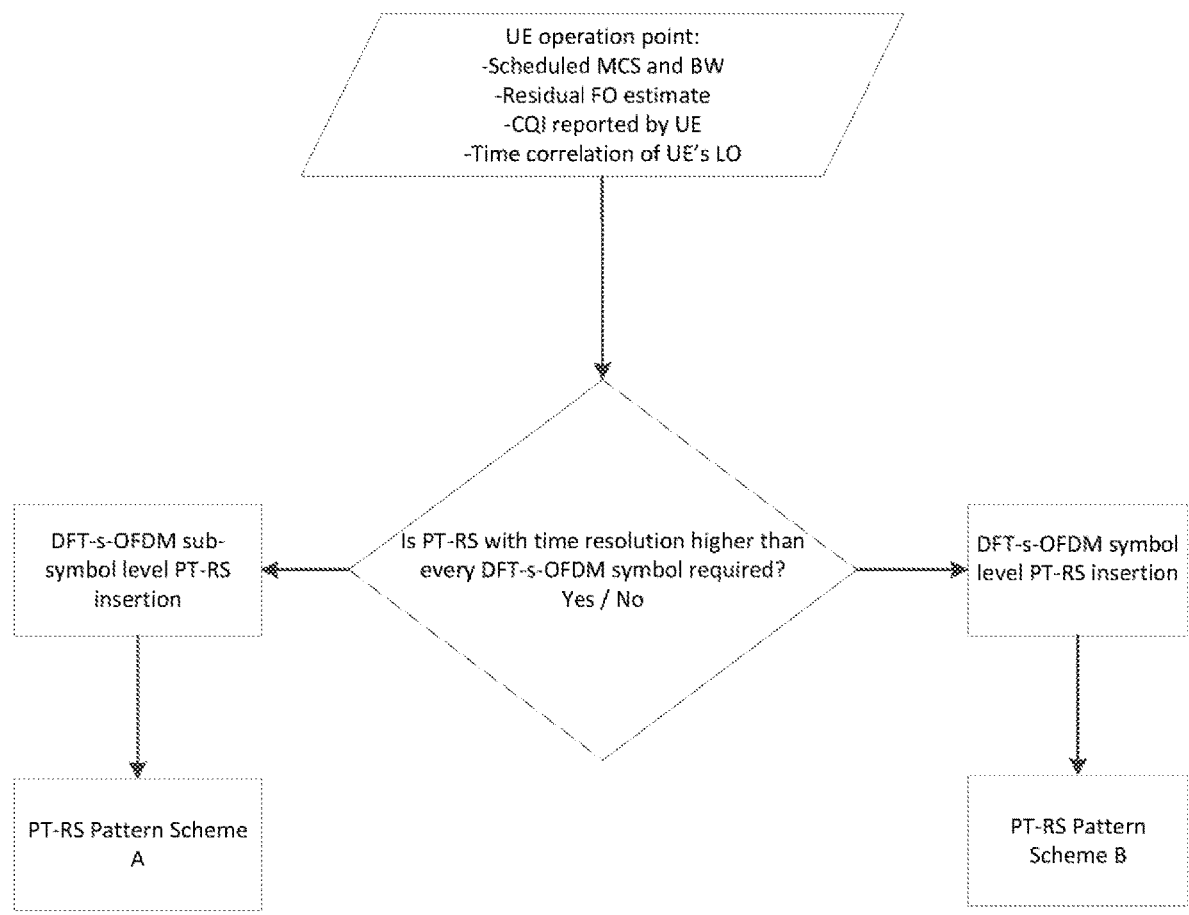
FIG. 3 illustrates an example flow diagram depicting a configuration process of a PT-RS time pattern, according to an embodiment.
Figure 4:
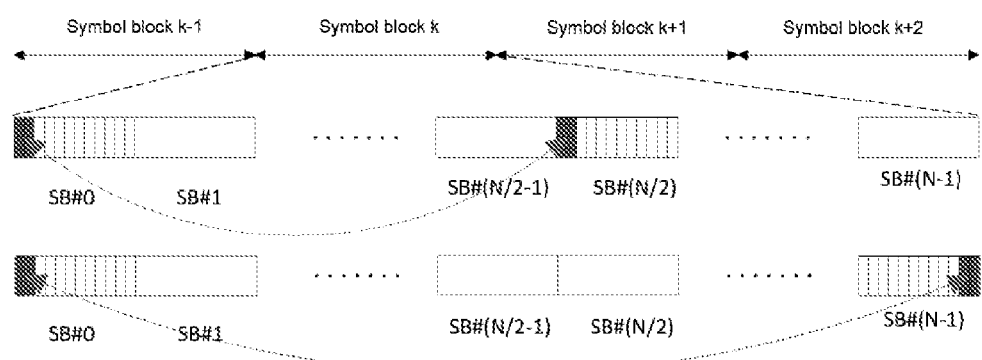
FIG. 4 illustrates an example PT-RS resource mapping and receiver interpolation, according to one embodiment.
Figure 5:
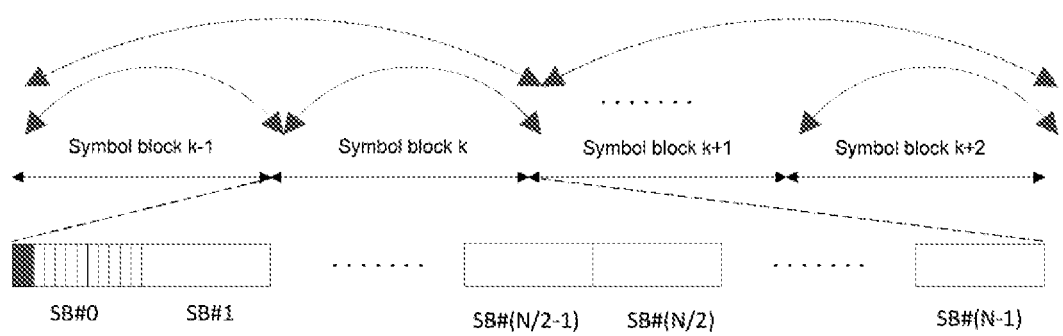
FIG. 5 illustrates an example PT-RS resource mapping and receiver interpolation, according to another embodiment.

FIG. 3 illustrates an example flow diagram depicting a configuration process of a PT-RS time pattern, according to an embodiment. FIG. 4 illustrates an example PT-RS resource mapping and receiver interpolation in case of DFT-s-OFDM sub-symbol level PT-RS insertion, which may be referred to herein as pattern scheme A, according to an embodiment. FIG. 5 illustrates an example PT-RS resource mapping and receiver interpolation in case of DFT-s-OFDM symbol level PT-RS insertion, which may be referred to as pattern scheme B, according to an embodiment.

In one embodiment, the PT-RS time pattern determination process may include that the PT-RS burst periodicity in time can be controlled on two different time scales, namely on DFT-s-OFDM symbol level or on DFT-s-OFDM sub-symbol level. On DFT-s-OFDM symbol level, through configuration it may be determined whether PT-RS is mapped to every, to every second or to every fourth DFT-s-OFDM symbol (referred to as 'symbol block' in FIG. 5). On DFT-s-OFDM sub-symbol level, through configuration it may be determined which of the samples of the DFT input block carries PT-RS (dark shaded in a subset of PRBs forming a 'symbol block k' in FIG. 4).

Depending on a UE's operation point (e.g., scheduled MCS and BW, numerology, carrier frequency, Doppler/residual FO), either PT-RS pattern scheme A (e.g., as depicted in FIG. 4) or pattern scheme B (e.g., as depicted in FIG. 5) may be adopted, according to certain embodiments. According to scheme B, K PT-RS sequence samples may be mapped with P symbol block periodicity (where P may take values e.g. from a set {1, 2, 4}), e.g., to the K first samples of every P-th M-length DFT input block. According to scheme A, K PT-RS sequence samples may be mapped with symbol block periodicity P=1, i.e., to every block, with possibility to split the K samples to multiple groups that are allocated non-contiguously in time within a symbol block. Moreover, in an embodiment, it may be assumed that M-length DFT input block comprises N length-(M/N) sub-blocks (referred to as SB #n, n=0, . . . , N−1).

In one embodiment, the K PT-RS samples may then be split into two groups of length-(K/2) (in general, split into more than two groups is not excluded), which can be allocated, according to either of at least two options. In a first option, the samples may be allocated to K/2 first samples of SB #0 and SB #(N/2). In a second option, the samples may be allocated to K/2 first samples of SB #0, and last K/2 samples of SB #(N−1). The first option may be preferred in case a given UE is scheduled with consecutive DFT-s-OFDM symbol blocks in time. To obtain phase estimates for the SB #(N/2) through SB #(N−1), PT-RS pilots from the beginning of the next symbol block may be required for interpolation. This would require minimum buffering of one symbol block (assuming linear interpolation based on two consecutive PT-RS bursts at a time). The second option may provide support for independent block-wise interpolation processing without buffering consecutive symbol blocks. Alternatively, receiver processing for the second option could average over the PT-RS resources across the block boundary (i.e., considering jointly the PT-RS samples at the end and at the beginning of the consecutive blocks). On the other hand, the first option can provide two times higher sampling resolution in time, compared to the second option, which can provide higher robustness against potential phase ambiguity problems in estimation for very high Doppler/residual FO scenarios.

Regarding i) the number of PT-RS samples per DFT-s-OFDM symbol block, K, and ii) their detailed resource mapping within symbol block (e.g. in case of pattern scheme A: number of sub-groups to split and location), pre-defined mapping/association rules between K and UE operation point characterizing parameters (e.g., scheduled MCS and BW, numerology, carrier frequency, Doppler/residual FO)

may be utilized. An example of such a PT-RS resource allocation rule is shown in Table 1 below. More specifically, Table 1 shows an example of a PT-RS resource allocation rule (in terms of number of PT-RS symbols, N_PTRS) as a function of UE's scheduled bandwidth (in terms of number of allocated PRBs, N_PRB) and corresponding overhead numbers.

TABLE 1

| N_PRB | N_Samples | N_PTRS samples | overhead(%) | including CP |
|---|---|---|---|---|
| 1 | 12 | 1 | 8.33 | 14.4 |
| 2 | 24 | 1 | 4.17 | 7.8 |
| 3 | 36 | 1 | 2.78 | 5.2 |
| 4 | 48 | 1 | 2.08 | 3.9 |
| 5 | 60 | 2 | 3.33 | 6.2 |
| 6 | 72 | 2 | 2.78 | 5.2 |
| 7 | 84 | 2 | 2.38 | 4.4 |
| 8 | 96 | 2 | 2.08 | 3.9 |
| 9 | 108 | 3 | 2.78 | 5.2 |
| 10 | 120 | 3 | 2.50 | 4.7 |
| 11 | 132 | 3 | 2.27 | 4.2 |
| 12 | 144 | 3 | 2.08 | 3.9 |
| 13 | 156 | 4 | 2.56 | 4.8 |
| 14 | 168 | 4 | 2.38 | 4.4 |
| 15 | 180 | 4 | 2.22 | 4.2 |
| 16 | 192 | 4 | 2.08 | 3.9 |
| 17 | 204 | 5 | 2.45 | 4.6 |
| 18 | 216 | 5 | 2.31 | 4.3 |
| 19 | 228 | 5 | 2.19 | 4.1 |
| 20 | 240 | 5 | 2.08 | 3.9 |
| 21 | 252 | 6 | 2.38 | 4.4 |
| 22 | 264 | 6 | 2.27 | 4.2 |
| 23 | 276 | 6 | 2.17 | 4.1 |
| 24 | 288 | 6 | 2.08 | 3.9 |

In an embodiment, for forward compatibility, re-configuration of the mapping/association rules may be performed either through RRC signaling, or through optional explicit DCI signaling (e.g., in the form of intended delta with reference to the pre-defined mapping/association rules).

According to one embodiment, PT-RS pattern scheme A can be selected for scenarios with very aggressive PN (showing low time-correlation) and/or high residual FO, where higher time resolution support for PT-RS resources is required to track very rapid changes in phase. It is noted that pattern scheme A may result in increased PT-RS overhead. Otherwise, PT-RS pattern scheme B can be selected due to its lower overhead.

Regarding the signaling of pattern details, in an embodiment, with one bit in DCI, a gNB can signal to a UE whether PT-RS time pattern scheme A or B is used. In another embodiment, a UE may implicitly determine the PT-RS pattern scheme and the associated PT-RS resource mapping details based on the pre-defined rules which map the UE operation point characterizing parameters to different PT-RS pattern configurations. In another embodiment, with two bits in DCI, a gNB can signal to a UE whether OCC is used for port multiplexing or not, and whether length L=2 or L=4 OCC is applied.

Figure 6:
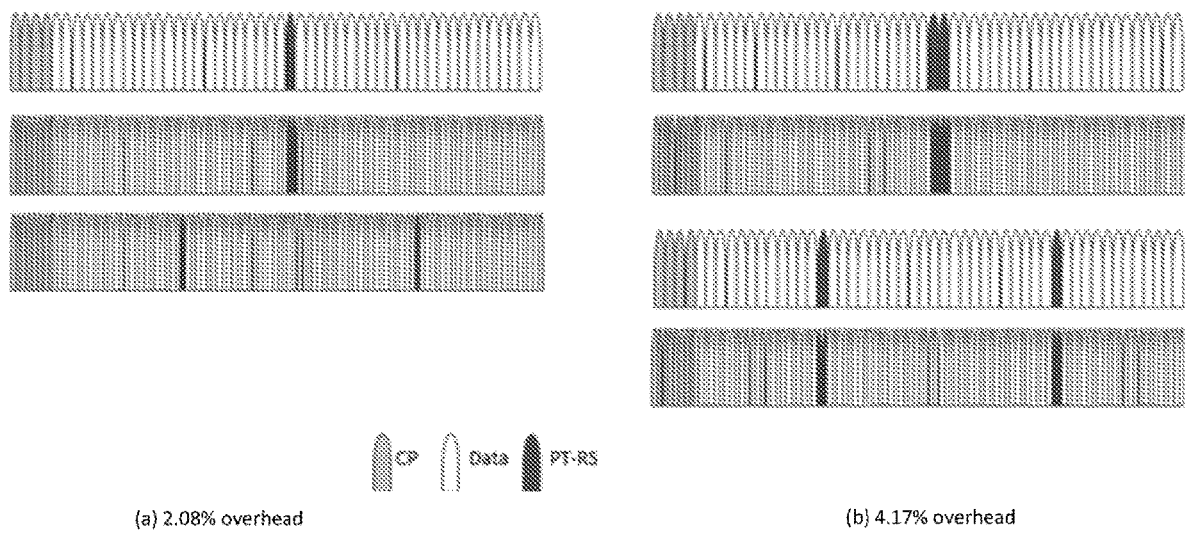
FIG. 6 illustrates an example of a time-domain pattern of PT-RS with two densities, according to an embodiment.

In another embodiment, some patterns may be pre-defined regardless of the allocated bandwidth. Table 2 shows an example of the relation of PT-RS overhead and scheduled bandwidth. Since the number of the samples per DFT-s-OFDM symbol block is varying per scheduled bandwidth, it may be difficult to fix the number of PT-RS samples. Also, it may be beneficial to maintain the PT-RS overhead with some level while guaranteeing the performance. The PT-RS performance is more related to the time duration and the interval. As shown in Table 2, it is possible to configure, for example, two PT-RS overhead levels (e.g., 2 or 4%), and pre-configure the pattern as illustrated in FIG. 6. In particular, FIG. 6 illustrates an example of proposed time-domain pattern of PT-RS with two densities of 2.08% and 4.17%. By using dynamic or higher layer signalling, one of the overhead levels can be selected, and the pattern (number of bursts) can be configurable.

TABLE 2

| Scheduled PRBs | DFT input size | Minimum PT-RS overhead (%) | Number of PT RS samples per PRB assuming 2.08% overhead (density of 1 PT-RS every 4 PRBs) | Number of PT RS samples per PRB assuming 4.17% overhead (density of 2 PT-RS every 4 PRBs) |
|---|---|---|---|---|
| 1 | 12 | 8.33 | (0.24) no PT-RS | (0.48) no PT-RS |
| 2 | 24 | 4.17 | (0.48) no PT-RS | 1 |
| 4 | 48 | 2.08 | 1 | 2 |
| 8 | 96 | 1.04 | 2 | 4 |
| 16 | 192 | 0.52 | 4 | 8 |
| 32 | 384 | 0.26 | 8 | 16 |

| Scheduled PRBs | # of PT-RS per PRB assuming 2.08% overhead/possibility for OCC | # of PT-RS per PRB assuming 4.17% overhead/possibility for OCC | # of PT-RS per PRB assuming 8.33% overhead/possibility for OCC |
|---|---|---|---|
| 1 | 1 PT-RS every 4 symbol/No | 1 PT-RS every 2 symbol/No | 1/No |
| 2 | 1 PT-RS every 2 symbol/No | 1/No | 2/Yes |
| 4 | 1/No | 2/Yes | 4/Yes |
| 8 | 2/Yes | 4/Yes | 8/Yes |
| 16 | 4/Yes | 8/Yes | 16/Yes |
| 32 | 8/Yes | 16/Yes | 32/Yes |

Figure 7:
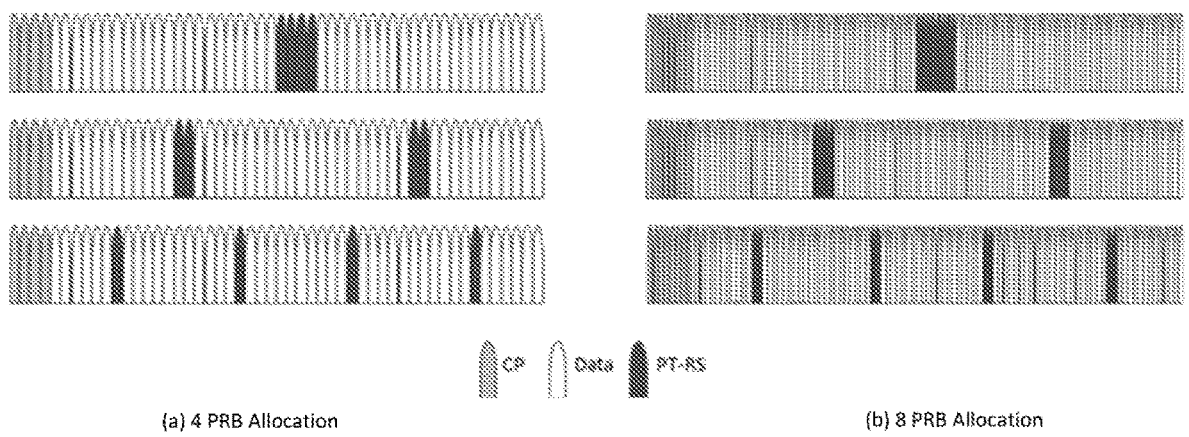
FIG. 7 illustrates an example of time domain patterns of PT-RS for scheduled bandwidth, according to an embodiment.

FIG. 7 illustrates an example of time domain patterns of PT-RS for scheduled bandwidth; overhead vs. scheduled bandwidth (from top to bottom: localized, hybrid and distributed). As illustrated in the example of FIG. 7, if the number of PT-RS samples is configured relative to the scheduled BW, then the same level of performance can be provided regardless of the scheduled BW.

Figure 8:
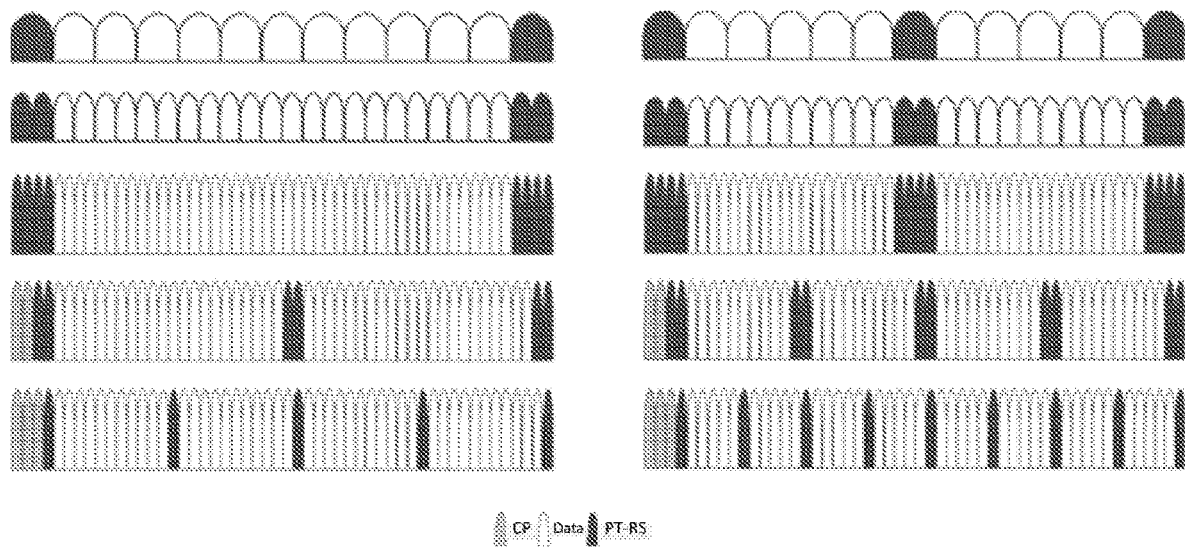
FIG. 8 illustrates examples of PT-RS allocation in CP with various scheduled BWs and RS densities, according to certain embodiments.

One possible variant, according to an embodiment, is to transmit one PT-RS burst at the end of the symbol. This enables duplication of PT-RS burst when adding CP. According to this embodiment, whole CP or part of CP can be used for phase estimation. FIG. 8 illustrates examples of PT-RS allocation in CP with various scheduled BWs and RS densities, according to certain embodiments.

Figure 9:
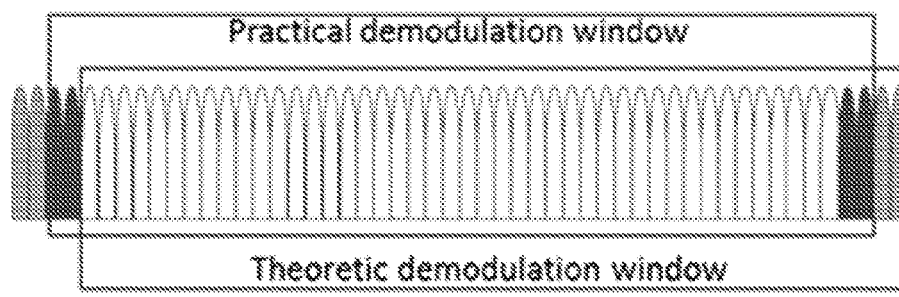
FIG. 9 illustrates examples of using PT-RS inside CP with practical demodulation window, according to an embodiment.

FIG. 9 illustrates examples of using PT-RS inside CP with practical demodulation window, according to an embodiment. In many cases, in order to minimize the timing error impact, the demodulator may use the samples from the center of the CP as depicted in FIG. 9. Then, without transmitting two bursts in a symbol, intra-symbol phase estimate without waiting next symbol is possible. This increases the resolution of the estimate and reduces the latency.

It should be noted that the DFT-s-OFDM waveform is primarily targeted for usage in coverage limited scenarios which are characterized with low to modest received SNR values. Moreover, the sensitivity of the data channel detection performance to PN and/or FO impairments increases with scheduled modulation and coding scheme (MCS). Furthermore, obtaining high quality PN and/or FO estimates at low SNRs with low RS overhead impose a challenge.

Figure 10:
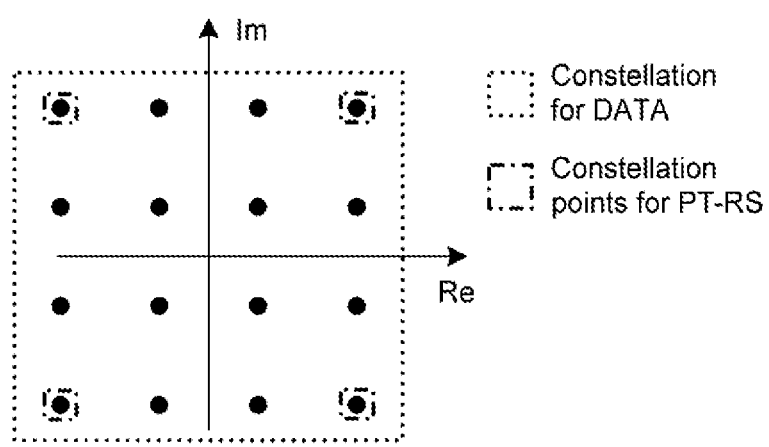
FIG. 10 illustrates an example of the outer-most constellation points usage for PT-RS sequence, according to one embodiment.

Consequently, one embodiment may be configured to utilize the outer-most constellation points corresponding to the scheduled modulation order of the Physical Uplink Shared Data Channel (PUSCH) for the PT-RS sample sequence. FIG. 10 illustrates an example of the outer-most constellation points usage for PT-RS sequence (assuming UE is scheduled with 16-QAM), according to an embodiment. More specifically, FIG. 10 illustrates the example case where a UE is assumed to transmit PUSCH with 16-QAM. By doing so, the PT-RS transmit power can be maximized without impact on PAPR/CM of the PT-RS carrying DFT-s-OFDM symbols. As a result, received SNR of PT-RS samples used for PN and/or residual FO estimation can be improved, and enhanced estimation accuracy versus PT-RS overhead trade-off can be obtained.

It should be noted that the examples of using outer most constellation points corresponding to the scheduled modulation order of PDSCH or PUSCH, according to certain embodiments, is not limited only to PT-RS for DFT-s-OFDM. Indeed, certain embodiments can also be applied, for example, to PT-RS for CP-OFDM.

In an embodiment, a pre-defined rule for constructing the PT-RS sequence from the out-most constellation symbols may be applied to avoid explicit signalling. For example, such a rule may include (other rules are not precluded) that the outer-most constellation point of the top right quadrant is selected as the first PT-RS sequence sample. The remaining K–1 samples (per DFT-s-OFDM symbol) may be obtained by picking the outer-most constellation points assuming clockwise circulation over the different quadrants. Usually, a random sequence may be used to reduce the DC offset; however, with such random sequence, phase estimate may be difficult with timing errors larger than sample. As a result, clockwise circulation can be helpful to mitigate the problem. In addition, the degree of circulation can be different for different PT-RS to be distinguished. For example, 90, 180 and 270 degree of circulation may be used for different UE's PT-RS.

Figure 11A:
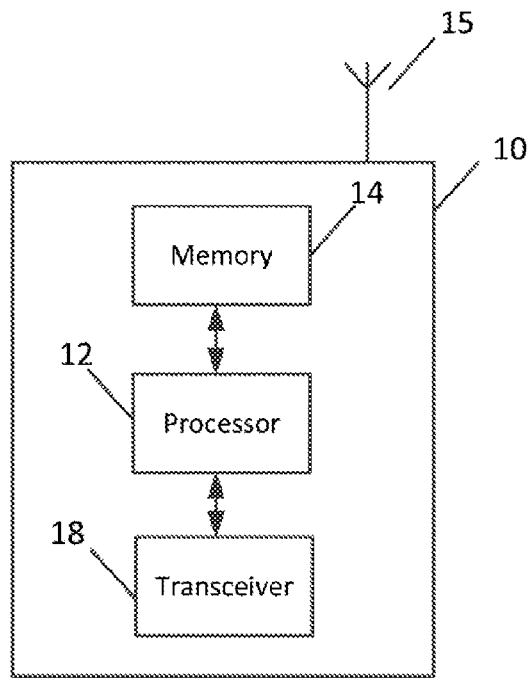
FIG. 11a illustrates an example block diagram of an apparatus, according to an embodiment.

FIG. 11a illustrates an example of an apparatus 10 according to an embodiment. In an embodiment, apparatus 10 may be a node, host, or server in a communications network or serving such a network. For example, apparatus 10 may be a base station, a node B, an evolved node B, 5G node B or access point, next generation node B (NG-NB or gNB), WLAN access point, mobility management entity (MME), or subscription server associated with a radio access network, such as a GSM network, LTE network, 5G or NR.

It should be understood that apparatus 10 may be comprised of an edge cloud server as a distributed computing system where the server and the radio node may be stand-alone apparatuses communicating with each other via a radio path or via a wired connection, or they may be located in a same entity communicating via a wired connection. It should be noted that one of ordinary skill in the art would understand that apparatus 10 may include components or features not shown in FIG. 11a.

As illustrated in FIG. 11a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 11a, multiple processors may be utilized according to other embodiments. For example, it should be understood that, in certain embodiments, apparatus 10 may include two or more processors that may form a multiprocessor system (i.e., in this case processor 12 represents a multiprocessor) that may support multiprocessing. In certain embodiments, the multiprocessor system may be tightly coupled or loosely coupled (e.g., to form a computer cluster).

Processor 12 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink). As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In certain embodiments, apparatus 10 may be a network node or RAN node, such as a base station, access point, node B, eNB, 5G or new radio node B (gNB) or access point, WLAN access point, or the like. According to certain embodiments, apparatus 10 may be controlled by memory 14 and processor 12 to perform the functions associated with any of the embodiments described herein. In one embodiment, apparatus 10 may be controlled by memory 14 and processor 12 to form or obtain a flexible and UE-specifically configurable PT-RS design that can adapt to diverse operation points of different UEs, and to utilize PT-RS sequence design techniques that reduce PT-RS overhead, e.g., by improving the SNR of received raw PT-RS samples as well as enabling efficient multiplexing of PT-RS resources of different UEs in UL MU-MIMO.

In one embodiment, apparatus 10 may be controlled by memory 14 and processor 12 to form or obtain a PT-RS sample sequence using the outer-most constellation points corresponding to the scheduled modulation order of the PUSCH. According to an embodiment, apparatus 10 may be controlled by memory 14 and processor 12 to scramble the obtained PT-RS sample sequence with a UE-specific sequence.

According to certain embodiments, apparatus 10 may be controlled by memory 14 and processor 12 to apply or utilize an Orthogonal Cover Code (OCC) of length L across the L consequent PT-RS samples in time within a PT-RS burst to Code Division Multiplex (CDM) multiple PT-RS ports of a given UE or multiple PT-RS ports among different MU-MIMO users with same PRB allocation.

In one embodiment, apparatus 10 may be controlled by memory 14 and processor 12 to UE-specifically configure the PT-RS burst periodicity and burst length based on, for example, residual FO (due to insufficient frequency synchronization and/or Doppler) estimated by apparatus 10, a CQI reported by UE, and/or information on time-correlation properties of the UE's LO PN (obtained, e.g., in the form UE device category during the RRC hand-shake). Based on these and the ability to perform advanced interpolation methods (e.g., Wiener estimation compared to linear), apparatus 10 may be controlled by memory 14 and processor 12 to optimize the PT-RS time pattern (periodicity and length of the PT-RS bursts) and/or optimize the L parameter.

In one embodiment, apparatus 10 may be controlled by memory 14 and processor 12 to receive a report from one or more UE(s) in PUCCH its estimates of: the LO induced PN time-correlation properties, Doppler frequency, and/or information regarding the UE's ability to perform advanced interpolation methods, such as Wiener estimation compared to linear. Based on these, apparatus 10 may be controlled by memory 14 and processor 12 to optimize the PT-RS time pattern (periodicity and length of the PT-RS bursts).

According to an embodiment, apparatus 10 may be controlled by memory 14 and processor 12 to define the number of PT-RS samples based on amount of allocated PRBs. For example, in one embodiment, apparatus 10 may be controlled by memory 14 and processor 12 to define the number of PT-RS samples by using the following equation: ceil (number of scheduled PRBs/R), where R={4,2,1}.

In one embodiment, apparatus 10 may be controlled by memory 14 and processor 12 to signal, to a UE, the configured PT-RS sequence, as optimized for the UE.

Figure 11B:
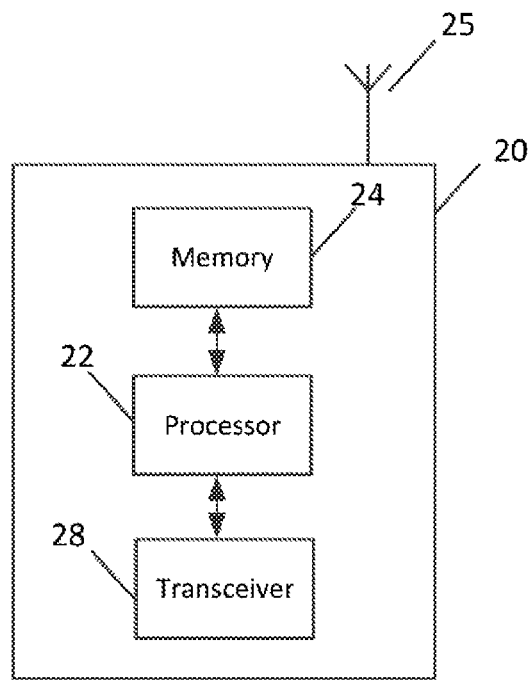
FIG. 11b illustrates an example block diagram of an apparatus, according to another embodiment.

FIG. 11b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, and the like), one or more radio access components (for example, a modem, a transceiver, and the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, and any other radio access technologies. It should be noted that one of ordinary skill in the art would understand that apparatus 20 may include components or features not shown in FIG. 11b.

As illustrated in FIG. 11b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 11b, multiple processors may be utilized according to other embodiments. For example, it should be understood that, in certain embodiments, apparatus 20 may include two or more processors that may form a multiprocessor system (i.e., in this case processor 22 represents a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 24 can be comprised of any combination of random access memory (RAM), read only memory (ROM), static storage such as a magnetic or optical disk, or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to one embodiment, apparatus 20 may be a UE, mobile device, mobile station, ME, IoT device and/or NB-IoT device, for example. According to certain embodiments, apparatus 20 may be controlled by memory 24 and processor 22 to perform the functions associated with embodiments described herein. For example, in some embodiments, apparatus 20 may be configured to perform one or more of the processes depicted in any of the flow charts or signaling diagrams described herein.

According to one embodiment, apparatus 20 may be controlled by memory 24 and processor 22 to transmit to a network node (e.g., gNB), for example in PUCCH, the apparatus 20 estimates of: the LO induced PN time-correlation properties, Doppler frequency, and/or information regarding the UE's ability to perform advanced interpolation methods, such as Wiener estimation compared to linear. Based on this information, the network node can optimize the PT-RS time pattern (periodicity and length of the PT-RS bursts) for apparatus 20. In an embodiment, apparatus 20 may be controlled by memory 24 and processor 22 to receive an indication of the PT-RS sequence as specifically configured and optimized for apparatus 20. According to one embodiment, apparatus 20 may be controlled by memory 24 and processor 22 to apply the received PT-RS sequence.

In view of the above, embodiments of the invention provide several technical effects and/or improvements and/or advantages. For example, certain embodiments can achieve a flexible and UE-specifically configurable PT-RS design that can adapt to diverse operation points of different UEs, and can provide PT-RS sequence design techniques that reduce PT-RS overhead, e.g., by improving the SNR of received raw PT-RS samples as well as enabling efficient multiplexing of PT-RS resources of different UEs in UL MU-MIMO. As a result, certain embodiments can improve performance and throughput of network nodes including, for example, base stations, eNBs, gNBs and/or UEs. Accordingly, the use of embodiments of the invention result in improved functioning of communications networks and their nodes.

In some embodiments, the functionality of any of the methods, processes, signaling diagrams, or flow charts described herein may be implemented by software and/or computer program code or portions of code stored in memory or other computer readable or tangible media, and executed by a processor.

In certain embodiments, an apparatus may be included or be associated with at least one software application, module, unit or entity configured as arithmetic operation(s), or as a program or portions of it (including an added or updated software routine), executed by at least one operation processor. Programs, also called computer program products or computer programs, including software routines, applets and macros, may be stored in any apparatus-readable data storage medium and include program instructions to perform particular tasks.

A computer program product may comprise one or more computer-executable components which, when the program is run, are configured to carry out embodiments described herein. The one or more computer-executable components may include at least one software code or portions of code. Modifications and configurations required for implementing the functionality of an embodiment may be performed as routine(s), which may be implemented as added or updated software routine(s). In some embodiments, software routine(s) may be downloaded into the apparatus.

Software or a computer program code or portions of code may be in a source code form, object code form, or in some intermediate form, and may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and/or software distribution package, for example. Depending on the processing power needed, the computer program may be executed in a single electronic digital device or it may be distributed amongst a number of devices or computers. The computer readable medium or computer readable storage medium may be a non-transitory medium.

In other embodiments, the functionality may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that can be carried by an electromagnetic signal downloaded from the Internet or other network.

According to an embodiment, an apparatus, such as a node, device, or a corresponding component, may be configured as a computer or a microprocessor, such as single-chip computer element, or as a chipset, including at least a memory for providing storage capacity used for arithmetic operation(s) and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the example embodiments, therefore, reference should be made to the appended claims.

We claim:

1. A method, comprising:
    forming, configured by a network node, a phase tracking reference signal sample sequence utilizing outer-most constellation points corresponding to scheduled modulation order of data channel for discrete Fourier transform spread orthogonal frequency division multiplexing; and
    applying orthogonal cover code of length L across L consequent phase tracking reference signal sequence samples in time within a phase tracking reference signal burst to code division multiplex at least one phase tracking reference signal port of a given user equipment.

2. The method according to claim 1, wherein the phase tracking reference signal sample sequence is further formed by scrambling with a user equipment-specific sequence.

3. The method according to claim 1, further comprising:
    signaling, to a user equipment, the phase tracking reference signal sample sequence configured for the user equipment.

4. The method according to claim 1, further comprising:
    applying the orthogonal cover code to multiple phase tracking reference signal ports among different multi-user multiple-input and multiple-output users with a same physical resource block allocation.

5. The method according to claim 1, further comprising:
    defining a number of the phase tracking reference signal sequence samples based on an amount of allocated physical resource blocks.

6. The method according to claim 5, wherein the defining further comprises defining the number of phase tracking reference signal sequence samples by using the following equation: ceil(number of scheduled PRBs/R), where R={4, 2,1}.

7. The method according to claim 1, wherein discrete Fourier transform input block comprises N sub-blocks and K phase tracking reference signal sequence samples are split into N groups of length K/N with first group allocated to first K/N samples of sub-block #0, and last group allocated to last K/N samples of sub-block #(N−1).

8. The method according to claim 1, wherein the forming of the phase tracking reference signal sample sequence further comprises:
    user equipment-specifically configuring the phase tracking reference signal burst periodicity and burst length based on at least one of residual frequency offset estimated by the network node, a channel quality indication reported by the user equipment, or information on time-correlation properties of the user equipment's local oscillator phase noise.

9. The method according to claim 1, wherein the phase tracking is time domain multiplexed with a physical uplink shared data channel.

10. An apparatus, comprising:
    at least one processor; and
    at least one memory comprising computer program code,
    the at least one memory and computer program code configured, with the at least one processor, to cause the apparatus at least to:
    form a phase tracking reference signal sample sequence utilizing outer-most constellation points corresponding to scheduled modulation order of data channel for discrete Fourier transform spread orthogonal frequency division multiplexing; and
    apply orthogonal cover code of length L across the L consequent phase tracking reference signal sequence samples in time within a phase tracking reference signal burst to code division multiplex at least one phase tracking reference signal port of the apparatus.

11. The apparatus according to claim 10, wherein the phase tracking reference signal sample sequence is further formed by scrambling with a user equipment-specific sequence.

12. The apparatus according to claim 10, wherein the at least one memory and computer program code are further configured, with the at least one processor, to cause the apparatus at least to:
    signal, to a user equipment, the phase tracking reference signal sample sequence configured for the user equipment.

13. The apparatus according to claim 10, wherein the at least one memory and computer program code are further configured, with the at least one processor, to cause the apparatus at least to:
    apply the orthogonal cover code to multiple phase tracking reference signal ports among different multi-user multiple-input and multiple-output users with a same physical resource block allocation.

14. The apparatus according to claim 10, wherein the at least one memory and computer program code are further configured, with the at least one processor, to cause the apparatus at least to:
    define a number of the phase tracking reference signal sequence samples based on an amount of allocated physical resource blocks.

15. The apparatus according to claim 14, wherein the at least one memory and computer program code are further configured, with the at least one processor, to cause the apparatus at least to:
    define the number of phase tracking reference signal sequence samples by using the following equation: ceil(number of scheduled PRBs/R), where R={4,2,1}.

16. The apparatus according to claim 10, wherein discrete Fourier transform input block comprises N sub-blocks and K phase tracking reference signal sequence samples are split into N groups of length K/N with first group allocated to first K/N samples of sub-block #0, and last group allocated to last K/N samples of sub-block #(N−1).

17. The apparatus according to claim 10, wherein the at least one memory and computer program code are further configured, with the at least one processor, to cause the apparatus at least to:
    user equipment-specifically configuring the phase tracking reference signal burst periodicity and burst length based on at least one of residual frequency offset estimated by the apparatus, a channel quality indication reported by the user equipment, or information on time-correlation properties of the user equipment's local oscillator phase noise.

18. The apparatus according to claim 10, wherein the phase tracking is time domain multiplexed with a physical uplink shared data channel.

19. The method according to claim 10, wherein the phase tracking is frequency domain multiplexed with a physical downlink shared data channel.

\* \* \* \* \*